June 8, 1943. S. MYERSON Re. 22,331

ARTIFICIAL TOOTH

Original Filed March 15, 1940

Inventor
Simon Myerson
By Roberts, Cushman & Woodberry
Att'ys.

UNITED STATES PATENT OFFICE 22,331

ARTIFICIAL TOOTH

Simon Myerson, Brookline, Mass.

Original No. 2,300,305, dated October 27, 1942, Serial No. 412,574, September 27, 1941, which is a division of Serial No. 324,127, March 15, 1940. Application for reissue filed April 7, 1943, Serial No. 482,214

11 Claims. (Cl. 32—8)

This invention pertains to artificial teeth and relates more particularly to improvements designed to impart an appearance more closely simulating that of natural teeth than has heretofore been done, the present application being a division of my copending application Serial No. 324,127, filed March 15, 1940.

Attempts have previously been made by teeth manufacturers and dentists to make artificial teeth resemble natural teeth in appearance, but despite the most artistic carving and the application of stains and glaze by the dentist, the artificial tooth is readily distinguishable from the normal tooth, at least by experienced persons.

Apparently most previous experiments designed to improve the visual appearance of artificial teeth have been without due regard to the fact that when in use the tooth is viewed against the dark background afforded by the oral cavity, and that the effect of light striking the tooth and being partially reflected therefrom is greatly modified by the presence of this dark background. Failing to recognize this fact, much of the prior experiment and practice has been concerned with the use of colored materials and the application of stains or the like in the effort to obtain the peculiar shadowy effect observed in natural teeth under varying light conditions, but whereas colored material or stain may be effective for the intended purpose under some light conditions they frequently fail utterly to give the desired results under different light conditions, it being well recognized that artificial teeth are particularly noticeable as such at night when observed under artificial light.

While it is a matter of common knowledge that in a very large percentage of natural teeth, the substantially transparent or at least translucent enamel layer not only covers the labial surface of the tooth, but forms in effect a cap at the incisal edge, and that in many instances at least this cap is of substantial depth so that it forms portions of both the labial and lingual surface of the tooth and extends a substantial distance downwardly beyond the relatively opaque body portion of the tooth, no one, so far as I am aware, has heretofore recognized the fact that this is an important factor in respect to the optical appearance of the natural tooth. Moreover, in the natural tooth, the opaque body portion usually tapers in thickness as it approaches the incisal edge so that its effective forward reflection of light gradually diminishes to the point where it merges with the material of the transparent cap. Thus the darkness of the oral cavity is effective not only at the extreme incisal edge but also for a substantial distance (but with diminishing intensity) away from said edge, and this I believe is responsible in large measure for the characteristic appearance of natural teeth as contrasted with that of artificial teeth made in accordance with prior practice.

The principal object of the present invention is to provide artificial teeth which as nearly as possible simulate the appearance of natural teeth, when in use, such object being primarily attained by the novel arrangement of the transparent enamel and the relatively opaque body portion, as above described. To this end I cause the body portion to taper downward but to terminate short of the incisal edge, and cause the enamel layer which covers the labial surface of the tooth to merge with an incisal mass which receives and is fused with the tapered end of the body portion and which forms the incisal edge and also the lateral edges of the tooth. The transparent material is so blended with the more opaque body material that the finished tooth has a margin, including the incisal edge, which is preferably of substantially complete transparency, that is to say, it so freely admits the passage of light that objects may be seen with well defined outlines through the substance of the tooth at its incisal portion, the body and gingival portions being as opaque as may be desired.

I also construct the tooth or a tooth facing so that it may be manufactured in finished form and by mass production methods.

In order to obtain an even finer graduation and blending of light effects, it is contemplated that a layer of material, of a transparency intermediate those of the body portion and incisal cap, may be interposed between the labial surface of the tapering part of the body portion and the transparent enamel layer.

The result of the improved construction is that when the tooth is in use and viewed against the dark oral cavity, the incisal portion of the tooth appears to have a dark bluish shadowy fringe, closely simulating the natural tooth, such appearance varying with different light conditions and changes in perspective as it does in a natural tooth; so that teeth made in accordance with the present invention are almost undistinguishable from natural teeth even under the most trying light conditions, for example when viewed at night by artificial light; and at the same time, even though manufactured by mass production methods, possess the lack of uniformity of natural teeth.

Other objects and advantages of the present invention will be made manifest in the following more detailed description and by reference to the accompanying drawing, wherein.

Figure 1:
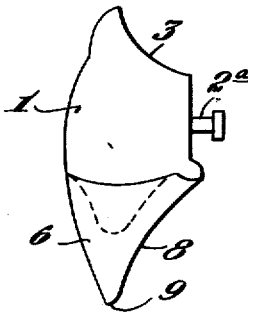
Fig. 1 is a side elevation of a tooth, for example an anterior tooth, embodying the present invention.
Figure 2:
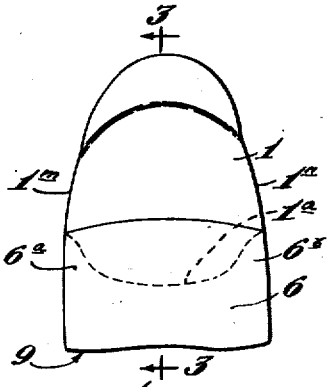
Fig. 2 is a front or labial view of the tooth of Fig. 1.

With reference to the following description of the improved tooth structure, it may first be stated that the improved tooth may be made in substantial accordance with usual methods employed in making artificial teeth, including the packing of suitable plastic slip material into the cavities of complemental mould members; the closing of the mould members and subjecting them to pressure and heat; and the subsequent removal of the "green" teeth from the mould and the firing of the teeth (assuming that they are of ceramic material) at a temperature such as to harden, and to some extent at least, fuse the material of which the tooth is composed.

While as above pointed out it is the principal object of the invention to provide artificial teeth which, when in use, are substantially indistinguishable in appearance from natural teeth, it is, of course, obvious that teeth made by a moulding process are not natural teeth, either in respect to the material of which they are constructed or in actual internal structure; nor are they subject to decay, disease or pain.

Referring to Figs. 1 to 5 of the drawing, which illustrate certain broad aspects of the invention, the numeral 1 designates the body portion of a tooth, such body portion being formed from a slip material designed to produce a body of a substantial degree of opacity, it being understood that the slip material forming the body portion may be tinted as desired, so as accurately to simulate the color of the body portion of a natural tooth.

The body portion 1 preferably has embedded therein a suitable anchorage, for example, a metal part 2, which receives a pin $2^a$ soldered or otherwise secured to the anchorage, and by means of which the tooth may be mounted on a support, for example, a plate or bridge.

The body portion 1 has the gingival surface 3, the labial surface 4 and the lingual or pin-bearing surface 5, which extends down from the gingival surface to the usual plate-limiting boss or shoulders and preferably tapers downwardly at its lower part to form a spur or tongue-like portion $1^a$, the lower end of which is substantially spaced from the incisal edge 9 of the finished tooth.

Below the body portion is an incisal mass 6 of enamel. The lower margin of this mass is shaped to form the incisal edge 8 which is of small radius (in vertical section) similar to that of the natural tooth. The incisal edge is vertically spaced from the horizontal plane of the lowest part of the body portion across the entire width of the tooth, and the incisal mass tapers downwardly in front-to-rear thickness (Fig. 3) from said plane. The incisal mass has an integral, forward portion, extending upwardly above said horizontal plane, said upward extension being here shown as tapering (as the tooth is viewed in vertical mid section, Fig. 3) to form a cusp and overlying and being fused to the labial surface of the body portion.

Figure 3:
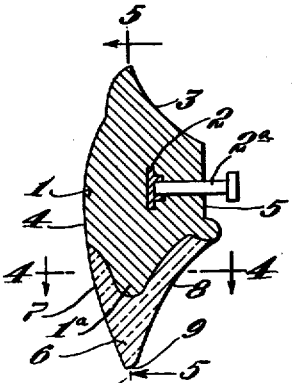
Fig. 3 is a vertical section on the line 3—3 of Fig. 2.
Figure 4:
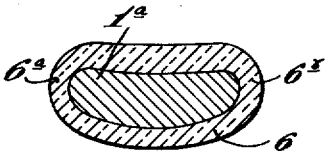
Fig. 4 is a transverse section on the line 4—4 of Fig. 3.
Figure 5:
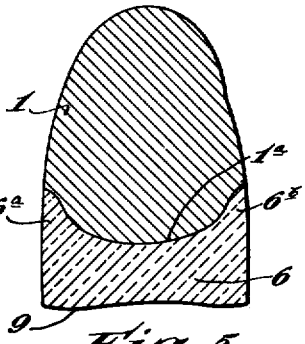
Fig. 5 is a vertical section substantially on the line 5—5 of Fig. 3.

Inspection of Fig. 3 shows that the surface or zone of contact between the forward, upwardly directed cusp of enamel and the labial surface of the body portion gradually recedes from said labial surface 4 of the body portion concomitantly with the approach of said contact surface or zone toward the incisal edge. In other words, the front-to-rear thickness of the cusp increases downwardly, and this gradual increase in thickness of enamel, together with the downward and rearward slope of the labial surface of the spur $1^a$, results in a progressive diminution of the amount of incident light which is reflected forwardly from said labial surface of the body portion (including the spur $1^a$) so that the color tone imparted by the body material to the tooth becomes less and less pronounced as said horizontal plane is approached.

As illustrated in Fig. 3, a second or rear extension or cusp, integral with the enamel mass, extends upwardly from said horizontal plane so as to overlie and is fused with the lower lingual surface of the body portion. Said rear cusp preferably extends up substantially to the usual plate-limiting boss or shoulder S of the tooth. The exposed rear surfaces of the enamel mass proper and its rear cusp merge smoothly, and collectively form the concave lingual surface 8 of the tooth, while the exposed forward surface of the enamel mass proper and the forward cusp merge smoothly, and collectively form the lower portion at least of the convex labial surface 7 of the tooth.

The incisal mass 6 also comprises integral lateral extensions $6^a$ and $6^b$ (Figs. 2 and 5) which extend upwardly at opposite sides of the spur $1^a$ of the body portion, the edges of these extensions $6^a$ and $6^b$ merging smoothly with the lateral edges $1^m$ and $1^n$ of the body portion. Thus, as herein specifically illustrated (Figs. 3 and 4), the incisal mass forms an inverted cap or crown having a downwardly directed cavity constituting in effect a socket for the reception of the spur $1^a$, the latter being embedded in and fused with the material forming the walls of such socket.

As here shown the spur $1^a$ terminates at a substantial distance above the incisal edge 9 of the tooth. This distance is such as to permit light to pass so freely through the entire width of the incisal portion of the tooth (except as such passage may be locally obstructed by stria or other defect-simulating elements embedded in the enamel mass) as to impart to the tooth the appearance when in use of having a dark shadowy fringe of progressively deepening tone, thereby to simulate natural teeth, as more fully described hereinafter. This distance is at least approximately one-third the horizontal distance between the labial surface 4 and the pin bearing surface 5, that is to say at least approximately one-third of the maximum front-to-rear horizontal thickness of the tooth at its upper portion. Since such front-to-rear thickness in usual and normal types of commercial artificial teeth is commonly in the neighborhood of three-sixteenths of an inch (at the upper portion of the tooth) the depth of the incisal mass in accordance with the ratio above suggested would usually be of the order of one-sixteenth of an inch or more.

When, in the appended claims, the distance between the lower end of the spur 1a and the incisal edge is referred to as a "substantial distance," the word "substantial" is hereby intended and is to be construed as indicative of a distance such as defined by the above specified dimensional relationships. The enamel-forming slip used in making the incisal cap 6 is such that when the tooth is completed the cap transmits light much more readily than does the material of the body portion 1. In fact, the cap is transparent to the extent that the outlines of an object may be seen through the substance of the tooth at the incisal portion of the latter, the tooth in this respect closely simulating a usual natural tooth.

When a tooth constructed as above described is arranged in normal position so as to be viewed against the dark background of the oral cavity, light is reflected forwardly from the labial surface 8 of the body portion 1, the latter being substantially opaque and usually of a light color, whereas light that strikes the labial surface 7 of the cap 6 passes quite freely through the cap material and is largely absorbed by the oral cavity, so that the cap portion appears as a dark fringe bordering the incisal portion of the tooth. The spur 1a of the body portion extends downwardly into the socket cavity in the upper part of the cap 6 as above described, not only to obtain a mechanical advantage in effecting a strong union between the body portion and the cap, but for the further reason that the gradually tapering spur 1a with its forwardly convex labial surface results in a gradual lessening of the amount of light which is reflected forwardly with a corresponding change in appearance from the relatively light appearing upper portion of the tooth down toward the dark incisal edge portion, thus further simulating the appearance of the natural tooth in which the opacity gradually increases from the incisal edge toward the gingival surface and likewise inwardly from the lateral edges toward the center of the tooth.

Figure 6:
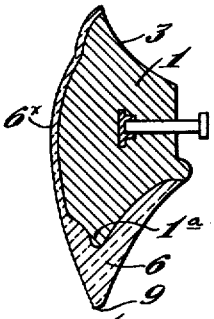
Fig. 6 is a section similar to Fig. 3, showing a modification.

While as illustrated in Fig. 3 the enamel forming the cap 6 terminates about midway the height of the tooth, it is contemplated that the enamel layer might be extended up even as far as the gingival surface. Thus, as shown in Fig. 6, where the tooth is otherwise like that in Fig. 3, the material forming the cap 6 is shown as extending up in a thin layer 6x covering and protecting the labial face of the body portion 1. With such an arrangement, if the enamel layer 6x be colorless but substantially transparent, the color of the body material will show through this enamel layer without substantial change except that the enamel layer imparts a bone-like or ivory luster to the entire labial surface of the tooth.

As disclosed in my Patent No. 2,202,713 issued May 28, 1941, the tooth may, if desired, be constructed so as further to simulate a natural tooth by the inclusion of narrow streaks or areas of a color or appearance which visually contrasts with that of the enamel and simulates the stains, dead spots, or striae common in natural teeth.

Figure 7:
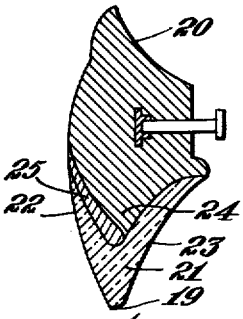
Fig. 7 is a section generally similar to that of Fig. 3, but illustrating a modification of the structure of Fig. 3.

In order to provide additional color effects, the arrangement of Fig. 7 may be used, wherein the body portion of the tooth is indicated at 20 and the enamel cap at 21 (the latter having the labial surface 22, the lingual surface 23 and the incisal edge surface 19) and there is interposed between the forwardly and upwardly extending part of the cap 21 and the forward surface of the spur, a layer 25 formed from slip material which may be of the same general character as that used in the body portion or in the cap portion if desired, but which is of a different color or shade. This layer being interposed between the lower part of the body portion and the labial portion of the cap, imparts its own coloration to this part of the tooth and is found useful in obtaining some of the effects which have heretofore been accomplished but in a crude and unsatisfactory way of staining.

Figure 8:
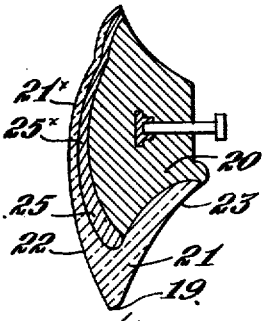
Fig. 8 is a section similar to Fig. 7, but showing a further modification.

As shown in Fig. 8, the arrangement of Fig. 7 may further be modified by extending the material 25 upwardly in a thin layer 25x overlying the body material, and covering this thin layer 25x with an upward extension 21x of the enamel which forms the cap 21.

In the above description, when reference has been made to the "upper" or "lower" part of the tooth, it is to be understood that these and similar directional terms are used merely for convenience in description and with reference to the drawing and without limiting intent.

Obviously other modifications and equivalent arrangements may be employed, and it is to be understood that all such modifications, substitutions of material, etc., as fall within the scope of the appended claims, are to be regarded as a part of the present invention.

I claim:

1. As an article of manufacture and sale, an artificial tooth having a downwardly and rearwardly sloping gingival surface, and a plate-limiting shoulder, the tooth being of the kind which has a body portion of relatively opaque ceramic material which constitutes the major part of the tooth and enamel which forms the incisal edge of the tooth, characterized in that the edge-forming enamel is an integral part of a mass of substantially colorless enamel of such transparency that the outline of an object may be seen through the substance of the tooth at its incisal portion, said mass of enamel having an upward extension overlying the lower part at least of the labial surface of the body portion, said mass of transparent enamel extending vertically down below the lowest point of the body portion to a distance which at least approximates one-third of the maximum horizontal distance between the labial and lingual surfaces of that part of the tooth which is above the plate-limiting shoulder, thereby imparting a dark appearance to the incisal portion of the tooth when the tooth is viewed against the dark background of the oral cavity.

2. An artificial tooth having a downwardly and rearwardly sloping gingival surface, a pin-bearing surface and a plate-limiting shoulder, said tooth comprising a body portion of relatively opaque material and being provided with pins for attaching the tooth to a support, and an incisal portion of material of such transparency that the outline of an object may be seen through the substance of the tooth at said incisal portion, said portions meeting and merging in a contact zone whose nearest approach to the incisal edge is at a distance from the latter which at least approximates one-third the maximum horizontal distance between the labial and pin-bearing surfaces of the tooth, said contact zone gradually receding from the labial face and from the lateral edges of the tooth as it approaches the incisal edge whereby the tooth has a relatively transparent light-transmitting fringe of substantial depth, the transparency of which gradually diminishes inwardly away from said edges.

3. A moulded artificial tooth constituting an article of manufacture and sale formed from mouldable material and devoid of roots, pulp-cavity or nerves, the tooth being of the kind which includes a body portion of relatively opaque ceramic material and a mass of enamel below the body portion, said mass of enamel tapering downwardly in front-to-rear thickness from the horizontal plane of the lowest part of the body portion, the lower margin of said enamel mass being shaped to form an incisal edge, said edge being spaced vertically below said plane across the entire width of the tooth, said enamel mass having an integral upwardly tapering portion extending upwardly above said horizontal plane and overlying and being fused to the labial surface of the lower part at least of the body portion, characterized in that the enamel mass is of substantially complete transparency and whose minimum depth below said horizontal plane at least approximates one-third of the maximum front-to-rear thickness of the upper portion of the tooth whereby a dark shadowy appearance is imparted to the tooth when the latter is viewed against the darkness of the oral cavity.

4. As an article of manufacture, a moulded artificial tooth including a body portion of relatively opaque material and a mass of substantially transparent enamel below the body portion, said mass of enamel tapering downwardly in front-to-rear thickness from the horizontal plane of the lowest part of the body portion, the lower margin of said enamel mass being shaped to form an incisal edge of small radius, said edge being spaced vertically a substantial distance below said plane across the entire width of the tooth, said enamel mass having integral portions extending upwardly above said horizontal plane at the front and rear sides respectively of the tooth, said extensions overlying and being fused to the lower portions at least of the labial and lingual surfaces of the body portion, the exposed surfaces of said upward extensions merging smoothly with the front and rear surfaces of the enamel mass proper thus providing smoothly curved convex and concave labial and lingual tooth surfaces, said latter surfaces converging toward the incisal edge, the depth of the incisal mass from said horizontal plane to the incisal edge exceeding the thickness of the enamel at any point above said horizontal plane as measured from the outer surface of the enamel in a direction normal to the surface of the body portion, its depth and transparency being such as to impart a dark shadowy appearance to the incisal portion of the tooth when the latter is viewed against the dark background of the oral cavity.

5. As an article of manufacture and sale, an artificial tooth, moulded from plastic material and devoid of roots, pulp-cavity or nerves, said tooth comprising a body portion which is relatively opaque and an incisal portion of substantially transparent material, said portions being so constructed and arranged that at the vertical mid-plane of the tooth said portions meet in a rearwardly and downwardly sloping line of contact whose distance from the labial surface of the tooth progressively increases and whose lowest point is a substantial distance above the incisal edge of the tooth, the incisal portion being thickest horizontally in the horizontal plane of the lower end of said line of contact and tapering downwardly from said horizontal plane, said tapering incisal portion being so transparent that the outlines of an object may be observed through its substance and the minimum depth of said transparent incisal mass below the lowest part of the body portion being such that when the tooth is viewed against the dark background of the oral cavity it appears to have a dark shadowy incisal fringe across its entire width.

6. As an article of manufacture and sale, an artificial tooth, formed from mouldable material, devoid of roots, pulp-cavity or nerves, said tooth comprising a body portion which is relatively opaque and an enamel portion of substantially transparent material, the enamel forming the major portion at least of the labial face of the tooth and constituting the incisal edge of the tooth across the entire width of the latter, the labial surface and lateral edges of said opaque body portion progressively receding from the exposed labial face and from the exposed lateral edges respectively of the tooth as they approach the incisal edge, the enamel portion comprising an incisal mass which is horizontally thickest from front to rear in the plane of the lowest point of the body portion and which tapers downwardly from said plane and which is of such transparency that the outline of an object may be seen through it, the lowest point of the body portion being spaced such a substantial distance from the incisal edge across the entire width of the tooth as to permit the transmission of light through said incisal mass from front to rear unobscured by any part of said body portion, thereby imparting a dark shadowy appearance to the incisal portion of the tooth when it is viewed against a dark background.

7. An artificial tooth comprising a body portion of relatively opaque material and constituting the major part of the tooth, and an incisal portion of a relatively transparent enamel, the lower part of the body portion tapering downwardly, at least in front-to-rear section, and the incisal portion terminating at the incisal edge, characterized in that the incisal portion is substantially sagittate in vertical front-to-rear section, having upper labial and lingual cusps, the incisal portion extending below the lower end of the body portion to a distance substantially exceeding the maximum front-to-rear thickness of its labial cusp, whereby when the tooth is viewed against the background of the oral cavity its incisal portion appears of gradually increasing darkness toward its incisal edge.

8. An artificial tooth comprising a body portion of relatively opaque material which constitutes the major part of the tooth and which terminates short of the incisal edge of the tooth, a layer of material of a different degree of opacity overlying that part of the labial surface of the body portion which is remote from the gingival surface of the tooth, and a cap of relatively transparent material which embraces the lower end of the body portion with its overlying layer of material, the cap terminating in an incisal edge and having labial and lingual faces which merge at said edge, the cap including a labial portion which extends upwardly a substantial distance above the lower end of the body portion, the cap extending downwardly below the lower end of the body portion to a distance which is substantially greater than the front-to-rear thickness of said upwardly extending labial portion of the cap whereby, when the tooth is viewed against the dark background of the oral cavity, the lower part of the tooth appears darker than the gingival portion of the tooth.

9. An artificial tooth of the kind having a body portion of relatively opaque ceramic material which constitutes the major part of the tooth and enamel forming the incisal edge of the tooth, characterized in that the edge-forming enamel is an integral part of a mass of substantially colorless enamel which is relatively more transparent than the material of the body of the tooth and which has an upward extension overlying the lower part at least of the labial surface of the body portion, said mass of enamel extending vertically down below the lowest point of the body portion to a distance exceeding one-third of the maximum horizontal distance between the labial and lingual surfaces of the tooth, thereby imparting a dark appearance to the incisal portion of the tooth when the tooth is viewed against the dark background of the oral cavity.

10. An artificial tooth having a body portion of relatively opaque material, said body portion being provided with means for attaching the tooth to a support, and an incisal portion of relatively transparent material, said portions meeting and merging in a contact zone whose nearest approach to the incisal edge is at a distance from the latter exceeding one-third the maximum horizontal distance between the labial and lingual surfaces of the tooth, said contact zone gradually receding from the labial face and from the lateral edges of the tooth while concomitantly approaching the incisal edge whereby the tooth has a relatively transparent light-transmitting fringe of substantial depth, the transparency of which gradually diminishes inwardly away from said edges.

11. An artificial tooth having a body portion of relatively opaque material which constitutes the major part of the tooth and a mass of relatively transparent enamel which forms the incisal edge, the body portion tapering downwardly to form a spur whose lower end is substantially spaced from the incisal edge of the finished tooth, the mass of enamel having a socket cavity in which the spur of the body portion is seated and a layer of ceramic material having a different visual appearance from that of the body of the tooth disposed against the labial surface of said spur, said layer having a thin upwardly directed extension overlying the upper part of the body portion of the tooth and extending substantially to the gingival surface, the mass of enamel which forms the incisal edge also having a thin upwardly directed extension which overlies the extension of the ceramic layer and which also terminates substantially at the gingival surface of the tooth.

SIMON MYERSON.

DISCLAIMER

Re. 22,331.—*Simon Myerson*, Brookline, Mass. ARTIFICIAL TOOTH. Patent dated June 8, 1943. Disclaimer filed Mar. 28, 1947, by the inventor.

Hereby enters this disclaimer to claims 1, 2, 3, 5, 6, 9, and 10 of said patent.

[*Official Gazette April 29, 1947.*]